D. A. BINGAMAN, OF JERSEY SHORE, PENNSYLVANIA, ADMINISTRATOR OF THE ESTATE OF JOSEPH BINGAMAN, DECEASED.

Letters Patent No. 87,820, dated March 16, 1869.

IMPROVED COMPOUND FOR DESTROYING WORMS ON PLANTS.

The Schedule referred to in these Letters Patent and making part of the same.

*To all whom it may concern:*

Be it known that JOSEPH BINGAMAN, deceased, late of Jersey Shore, in the county of Lycoming, and State of Pennsylvania, during his lifetime did invent a new and improved Compound for Destroying Insects on Trees; and I, D A. BINGAMAN, of Jersey Shore aforesaid, administrator of the estate of the said JOSEPH BINGAMAN, deceased, do hereby declare that the following is a full, clear, and exact description thereof, which will enable those skilled in the art to make and use the same.

The object of this invention is to provide a liquid which will, when applied to the roots of trees, destroy any pernicious and other insects which may infect them.

The ingredients are all cheap, and easily obtainable throughout the country generally, and the compound has been proved, by repeated and careful experiments, to operate in exterminating all insects which infest trees and shrubbery, and inflict damage thereto by stinging and boring the same.

It consists of the following ingredients and proportions, though the latter, as given below, may be reasonably departed from without materially affecting the active qualities of the compound:

Coal-oil, one-half gallon.
Vacuum-oil, so called, one quart.
Spirits of turpentine, one pint.
Common soft-soap, one pint.
Tallow, one pound, (avoirdupois.)
Common salt, one-quarter pound, (avoirdupois.)

These ingredients are simply mixed, and stirred well.

In applying it to trees and shrubbery, the roots are uncovered to the depth of four or five inches, and the adherent earth carefully brushed or scraped away.

The mixture is then applied lavishly with a common paint-brush, carrying the coating up fifteen or twenty inches on the trunk of the tree or bush.

The roots are then re-covered.

From two to three applications are all that is generally required to kill the worms and other insects attached to or resident in the bark of the tree or shrubbery.

This compound acts beneficially in other ways than as above described, for it has been found in practice that several applications will invigorate the sap, causing it to be apparently more abundant, and also causing, in many instances, the old bark to be shed off, leaving a newer and healthier inner bark to clothe the trunk.

Having thus described the invention,

What I claim as new, and desire to secure by Letters Patent, is—

The compound of matter for destroying insects on trees and shrubs, and promoting the healthy growth of the latter, substantially as herein described.

The above specification signed by me, this 24th day of November, 1868.

D. A. BINGAMAN.

Witnesses:
R. M. WEBB,
L. N. MUIR.